US010744890B2

(12) United States Patent
Long (10) Patent No.: US 10,744,890 B2
(45) Date of Patent: Aug. 18, 2020

(54) ELECTRIC VEHICLE POWER DISTRIBUTION SYSTEM

(71) Applicant: Wisk Aero LLC, Mountain View, CA (US)

(72) Inventor: Geoffrey Alan Long, Montara, CA (US)

(73) Assignee: WISK AERO LLC, Mountain View, CA (US)

(*) Notice: Subject to any disclaimer, the term of this patent is extended or adjusted under 35 U.S.C. 154(b) by 116 days.

(21) Appl. No.: 16/008,801

(22) Filed: Jun. 14, 2018

(65) Prior Publication Data

US 2018/0290544 A1 Oct. 11, 2018

Related U.S. Application Data

(63) Continuation of application No. 15/046,197, filed on Feb. 17, 2016, now Pat. No. 10,023,054.
(Continued)

(51) Int. Cl.
*B60L 50/50* (2019.01)
*H02J 7/00* (2006.01)
(Continued)

(52) U.S. Cl.
CPC ............. *B60L 50/50* (2019.02); *B60L 58/22* (2019.02); *H02J 7/0018* (2013.01);
(Continued)

(58) Field of Classification Search
CPC ............ H02J 7/0018; H02J 2007/0067; H02J 7/0065; B60L 58/22; B60L 2210/10;
(Continued)

(56) References Cited

U.S. PATENT DOCUMENTS 6,166,934 A * 12/2000 Kajouke .................. B60L 1/00
363/65
7,568,117 B1 7/2009 Fernald
(Continued)

FOREIGN PATENT DOCUMENTS

CN 101467324 A 6/2009
CN 101821920 A 9/2010
(Continued)

OTHER PUBLICATIONS

Wen-Yeau Chang. "The state of charge estimating methods for battery: A review." ISRN Applied Mathematics 2013 (2013).
(Continued)

*Primary Examiner* — Jared Fureman
*Assistant Examiner* — Duc M Pham
(74) *Attorney, Agent, or Firm* — Kilpatrick Townsend & Stockton LLP (57) ABSTRACT

One or more converters are selected from a plurality of converters to enable where there is a plurality of energy storage modules electrically connected together in series. Each converter is electrically connected to a corresponding energy storage module. The selected converters are enabled where in response to being enabled, an enabled converter converts an input, from its corresponding energy storage module, at a first voltage level into an output at a second voltage level and the outputs of the enabled converters are electrically combined to produce a combined output. The combined output is compared against a desirable operating region defined by an upper threshold and a lower threshold. In response to the combined output being outside of the desirable operating region, the number of enabled converters is adjusted.

20 Claims, 4 Drawing Sheets

Related U.S. Application Data (60) Provisional application No. 62/117,822, filed on Feb. 18, 2015.

(51) Int. Cl.
    *H02M 3/337*     (2006.01)
    *B60L 58/22*     (2019.01)
    *H02M 3/28*     (2006.01)
    *H02M 1/00*     (2006.01)

(52) U.S. Cl.
    CPC ......... *H02M 3/337* (2013.01); *B60L 2210/10* (2013.01); *B60L 2240/547* (2013.01); *B60L 2240/549* (2013.01); *H02J 2007/0067* (2013.01); *H02J 2207/20* (2020.01); *H02M 3/285* (2013.01); *H02M 2001/0074* (2013.01); *Y02T 10/7005* (2013.01); *Y02T 10/7055* (2013.01); *Y02T 10/7061* (2013.01); *Y02T 10/7216* (2013.01); *Y02T 10/92* (2013.01)

(58) Field of Classification Search
    CPC ............... B60L 2240/547; B60L 50/50; Y02T 10/7055; H02M 3/285; H02M 2001/0074
    See application file for complete search history.

(56) References Cited

U.S. PATENT DOCUMENTS

| | | |
|---|---|---|
| 10,023,054 B2 | 7/2018 | Long |
| 2004/0189248 A1 | 9/2004 | Boskovitch |
| 2010/0127565 A1 | 5/2010 | Fukazu |
| 2012/0194133 A1 | 8/2012 | Posamentier |
| 2012/0306406 A1 | 12/2012 | Grisamore |
| 2013/0026991 A1 | 1/2013 | Roessler |
| 2014/0035531 A1* | 2/2014 | Garnier ................. H02J 7/0068 320/118 |
| 2014/0103726 A1 | 4/2014 | Martin |

FOREIGN PATENT DOCUMENTS

| | | |
|---|---|---|
| CN | 103891094 A | 6/2014 |
| CN | 103997073 A | 8/2014 |
| DE | 102013210293 | 12/2014 |
| FR | 3003827 | 3/2015 |
| NZ | 732362 A | 4/2019 |
| WO | WO-2013047543 | 4/2013 |

OTHER PUBLICATIONS

U.S. Appl. No. 15/046,197, "Non-Final Office Action" dated Nov. 20, 2017, 8 pages.
U.S. Appl. No. 15/046,197, "Notice of Allowance" dated May 9, 2018, 7 pages.
Chinese Application No. 201680006196.2, "Office Action" dated Aug. 2, 2019, 20 pages (6 pages of Original Document and 14 pages of English Translation).
European Application No. 16752017.0, "Extended European Search Report" dated Aug. 14, 2018, 8 pages.
International Application No. PCT/IB2016/050862, "International Preliminary Report on Patentability" dated Aug. 31, 2017, 8 pages.
International Application No. PCT/IB2016/050862, "International Search Report and Written Opinion" dated Jun. 9, 2016, 9 pages.
CN201680006196.2, "Notice of Decision to Grant", dated Jun. 1, 2020, 5 pages.

* cited by examiner

ELECTRIC VEHICLE POWER DISTRIBUTION SYSTEM

CROSS REFERENCE TO OTHER APPLICATIONS

This application is a continuation of U.S. patent application Ser. No. 15/046,197, filed Feb. 17, 2016, which claims the benefit of U.S. Provisional Application No. 62/117,822, filed Feb. 18, 2015, both of which are incorporated herein by reference in their entirety.

BACKGROUND OF THE INVENTION

This disclosure relates to power distribution systems for electric vehicles.

Battery-powered vehicles commonly use batteries to supply both a high output voltage for powering the vehicle and low output voltages for operating various computers, lights, electric fans, and other low-power systems on board the vehicle. To provide the low voltage to the on-board systems, the batteries often include a voltage converter to convert the high output voltage to a lower voltage. The low-voltage power output of vehicle batteries is often a small fraction of the nominal power output of the battery. Because the amount of time the batteries operate in low-voltage modes can be very long, it is desirable for voltage converters to operate efficiently to reduce loss of energy stored in the batteries. However, the efficiency of voltage converters decreases as the difference between the input voltage and the output voltage increases.

To improve efficiency in low voltage modes, power systems for battery-powered vehicles may include an auxiliary battery having a suitable voltage output for operating the on-board systems without a converter. If the efficiency of a voltage converter for the high-voltage propulsion batteries drops below a threshold value, the auxiliary battery is used to supply power to the on-board systems. The auxiliary battery may be charged by the voltage converter of the high-propulsion batteries. However, an auxiliary battery represents a single point of failure for the power systems of the electric vehicle. A second auxiliary battery and voltage converter may be added to the power system to provide redundancy, but this redundancy adds weight to the vehicle.

SUMMARY

A power distribution system of an electric vehicle provides a high output voltage to propulsion systems of the electric vehicle and a low output voltage to on-board systems of the electric vehicle. In one embodiment, the power distribution system comprises a plurality of energy storage modules coupled in series and a plurality of electrically-isolated power converters each coupled across one or more of the energy storage modules. When enabled, the power converters provide a low voltage output to an output of the power distribution system, such as the on-board systems of the electric vehicle.

A control system controls the power converters of the power distribution system to provide the low output voltage. The control system selectively enables the power converters to balance power output of the energy storage modules. In one embodiment, the control system selectively enables power converters based on a state of charge of each of the energy storage modules. The control system may obtain a direct measurement of the state of charge of each of the modules, or may estimate the states of charge based on charge withdrawn from each of the modules or an amount of time the power converters corresponding to the modules have been enabled.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

The figures and the following description relate to various embodiments by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
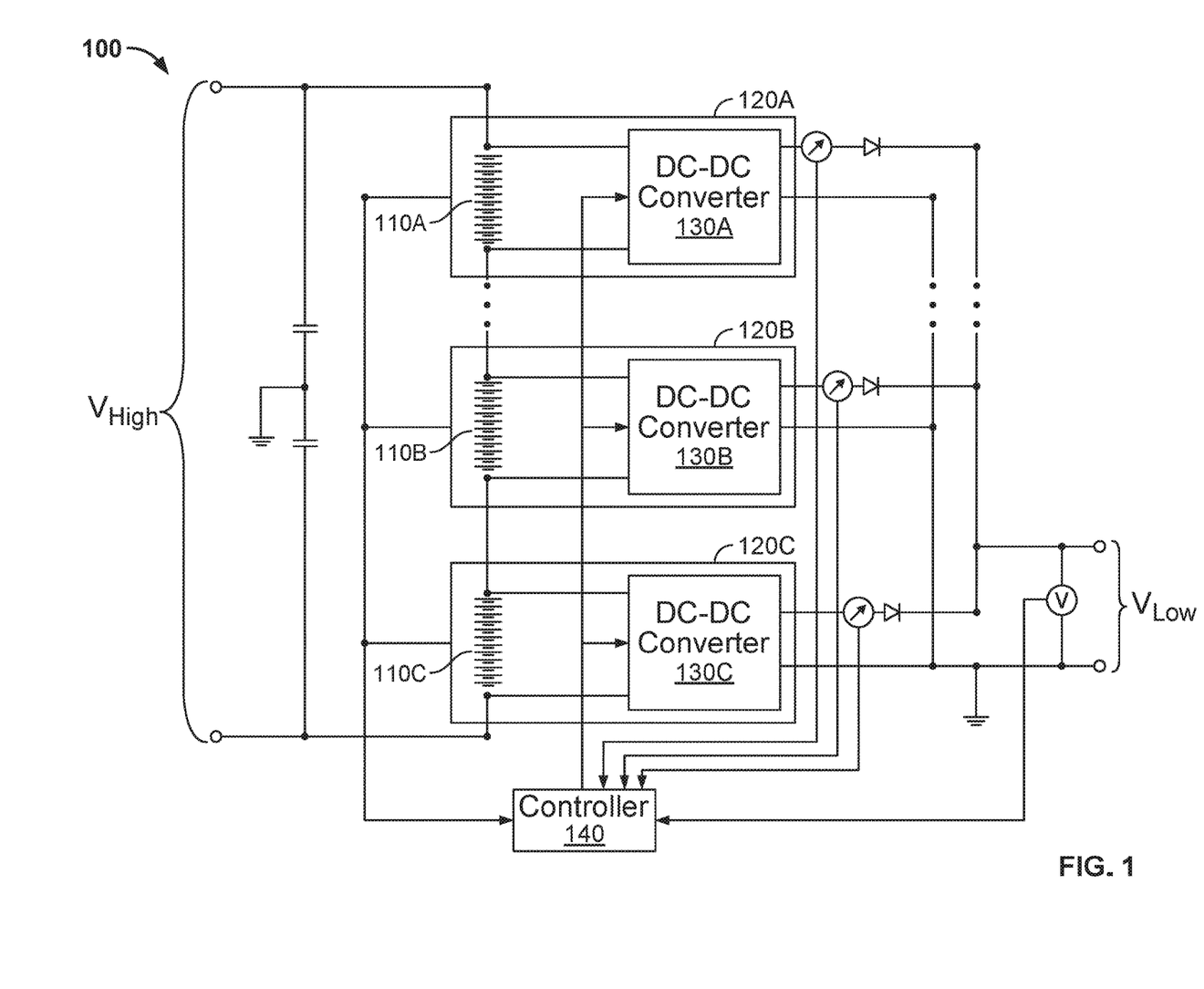
FIG. 1 is a block diagram of a power distribution system 100, according to one embodiment.

FIG. 1 is a block diagram of a power distribution system 100, according to one embodiment. The power distribution system 100 is suitable for use in a battery-powered vehicle, such as an electric car or aircraft. In one embodiment, the power distribution system 100 includes a plurality of energy storage modules 110A-C (collectively, energy storage modules 110), battery management systems 120A-C, and a plurality of power converters 130. Other embodiments of the power distribution system 100 may include additional or different components.

The energy storage modules 110 are coupled in series and collectively supply a high voltage output $V_{High}$ to propulsion systems of the battery-powered vehicle. Each energy storage module 110 includes one or more battery cells. For example, one embodiment of an energy storage module 110 has 12 battery cells each supplying a voltage of approximately 3V to 4.2V, resulting in a voltage range for the energy storage module 110 of approximately 36V to 50V. Although FIG. 1 illustrates only three energy storage modules 110 of the power distribution system 100, the power distribution system 100 may have any number of energy storage modules 110 for supplying $V_{High}$ to the propulsion systems. For example, one embodiment of the power distribution system 100 includes twelve energy storage modules 110.

In one embodiment, the energy storage modules 110 are managed by a plurality of battery management systems 120. The battery management systems 120 monitor a state of the modules 110. The state of the modules 110 may include the voltage of all the modules' battery cells, the current output of the modules 110, temperature of the modules 110, the state of charge of the module 110, and other factors influencing the overall health of the modules 110.

The power converters 130 are coupled across one or more of the energy storage modules 110 and convert DC voltage output of the energy storage modules 110 to a desired DC low output voltage compatible with on-board systems of the battery-powered vehicle. When enabled, each power converter 130 is configured to produce an output voltage compatible with voltage specifications of the on-board systems by stepping down the voltage of the energy storage module or modules 110 corresponding to the respective power converter 130 to the desired low output voltage. When disabled, a power converter 130 does not provide current to the on-board systems. In one embodiment, the power converters 130 are configured to collectively supply a peak low power output to the on-board systems (e.g., when a maximum number of the on-board systems are turned on and each is supplying its maximum current), while a subset of the power converters 130 are enabled during operating modes requiring less power. In another embodiment, the each power converter 130 is configured to step up the voltage of the energy storage modules 110 to a low voltage output $V_{Low}$. In still another embodiment, the each power converter 130 is configured to step up or down the voltage of the energy storage modules 110 to a low voltage output $V_{Low}$, according to the state of charge and load on the energy storage modules 110.

The power converters 130 may be incorporated into the battery management systems 120, as shown in FIG. 1, or may be external to the battery management systems 120. In one embodiment, the power converters 130 or the battery management system 120 monitor health of the power converters 130 and the energy storage modules 110. For example, the battery management system 120 monitors internal resistance, energy storage capacity, voltage, self-discharge, and number of charge/discharge cycles of the energy storage modules 110 to analyze the state of healthy of the modules 110, and monitors under- and over-voltage conditions of the power converters 130. If the battery management system 120 finds any converters 130 or energy storage modules 110 to be faulty, the faulty converters or the converters corresponding to the faulty modules 110 are deactivated. Alternatively, each of the power converters 130 comprises a fuse configured to disconnect the power converter 130 from the low voltage output of the power distribution system 100 during a fault condition. Furthermore, as the voltage across the energy storage modules 110 may be different and the power converters 130 are coupled to a common output, the power converters 130 are galvanically isolated.

The controller 140 selectively enables the power converters 130 to provide a low voltage output $V_{Low}$. In one embodiment, the controller 140 selects one or more modules 110 to provide the low voltage output $V_{Low}$ to efficiently operate the power distribution system 100. Moreover, the controller 140 may select the modules 110 for providing output power such that the state of charge of the modules 110 of power distribution system 100 is kept balanced within a desired range. The controller 140 enables the power converters 130 coupled across the selected modules, which convert the voltage output of the selected modules to $V_{Low}$. The controller 140 may select the modules to be enabled in a variety of different manners. In one embodiment, the controller 140 selectively enables power converters 130 based on states of charge of the modules 110 corresponding to each of the power converters 130. In another embodiment, the controller 140 selectively enables power converters 130 such that product of the amount of output current and the duration of it being enabled is substantially equal across all modules 110. In this way, the amount of energy withdrawn from each module will be substantially equal, and the states of charge of the modules will remain balanced as they discharge.

Figure 2:
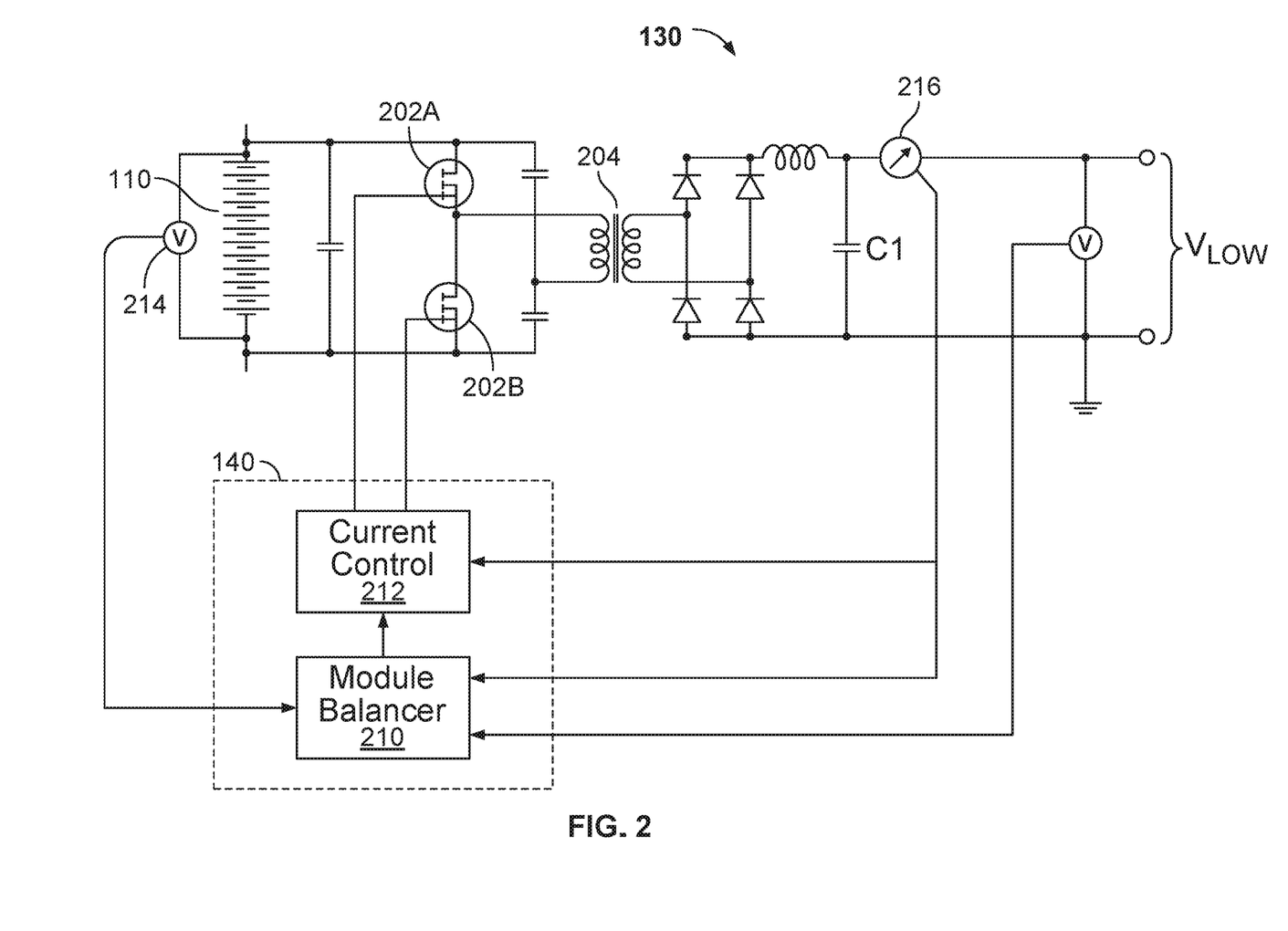
FIG. 2 illustrates an example DC power converter, according to one embodiment.

FIG. 2 illustrates an example power converter 130. The example converter 130 shown in FIG. 2 is configured in a half-bridge topology, although the power converter 130 may alternatively be configured according to other converter topologies having galvanically isolated outputs (e.g., flyback or buck topologies). In the embodiment illustrated in FIG. 2, the power converter 130 comprises switches 202A and 202B and a transformer 204. The switches 202 turn on or off alternately to generate a current in a primary coil of the transformer 204. The voltage across the primary coil of the transformer 204 generates a corresponding current in a secondary coil of the transformer 204, creating a voltage across the capacitor C1 that is output to the low voltage output. In one embodiment, switching of the switches 202 is controlled by the controller 140 to generate a desired output voltage from the power converter 130. The transformer 204 galvanically isolates the output of the power converter 130 from the energy storage module 110, and one or more diodes on the secondary side of the transformer 204 isolate the plurality of power converters 130 of the power distribution system 100.

The controller 140 receives an output current of the converter 130 from an ammeter 216, output voltage, and a voltage across the module 110 corresponding to the converter 130. The controller 140 controls switching of the switches 202 based on the output current and the voltage of the module 110 to regulate the output voltage $V_{Low}$. In one embodiment, as shown in FIG. 2, the controller 140 comprises a module balancer 210 and one or more current control blocks 212.

The module balancer 210 receives a measure of the voltage input to the power converter 130 from a voltmeter 214 of the battery management system 120. For example, if the power converter 130 is coupled across one module 110 of the power distribution system 100 as shown in FIG. 2, the module balancer 210 receives the module's voltage from the voltmeter 214 coupled across the module 110. Although FIG. 2 illustrates the module balancer 210 receiving the voltage from a single voltmeter 214, the module balance 210 may receive the voltage measured by voltmeters coupled across each of the modules 110 or sets of the modules 110. The module balancer 210 also receives the low output voltage $V_{Low}$ as feedback. The module balancer 210 regulates the low output voltage or the output power based on the feedback. In one embodiment, the module balancer 210 determines a number of energy storage modules 110 to enable to achieve the desired low output voltage $V_{Low}$, and generates a control signal input to the one or more current control blocks 212 to enable the selected number of modules 110.

As the energy storage modules 110 may have different states of charge at a given time due to variability in internal resistance and different amounts of energy storage capacity, the module balancer 210 selectively enables the power converters 130 to balance the modules 110 during the course of operation of the power distribution system 100. The module balancer 210 balances the modules 110 by selectively activating power converters 130 based on states of charge of the modules 110. In one embodiment, the module balancer 210 receives the states of charge of the modules 110 from the battery management systems 120, and enables one or more power converters 130 corresponding to modules 110 having higher states of charge. However, as the battery management systems 120 may not be configured to directly measure the states of charge of the modules 110, one embodiment of the module balancer 210 estimates the states of charge based on current output from the power converters 130. For example, the module balancer 210 determines an amount of charge withdrawn from the modules 110 corresponding to each power converter 130 based on the current output of the power converter 130 over time. In another case, the module balancer 210 enables the power converters 130 for equal periods of time. For example, the module balancer 210 monitors an amount of time each of the power converters 130 is enabled and rotates through the power converters 130 to enable the power converters 130 for approximately the same length of time. One embodiment of a process for balancing the modules 110 is described with respect to FIG. 4.

The current control circuit 212 receives the control signal generated by the module balancer 210 to selectively activate one or more of the power converters 130. Based on the control signal, the current control circuit 212 generates control signals to turn on and turn off the switches 202 of the power converter 130. For example, if the module balancer 210 generates a control signal to enable a particular power converter 130, the current control circuit 212 generates signals to turn on and off the switches 202 in response to receiving the control signal. In one embodiment, the controller 140 includes a current control circuit 212 for each power converter 130 of the power distribution system 100. The current control circuit 212 receives a signal from the ammeter 216 that is indicative of the current output by the power converter 130. The current control circuit 212 drives the switches 202 to regulate current output from the power converter 130.

Figure 3:
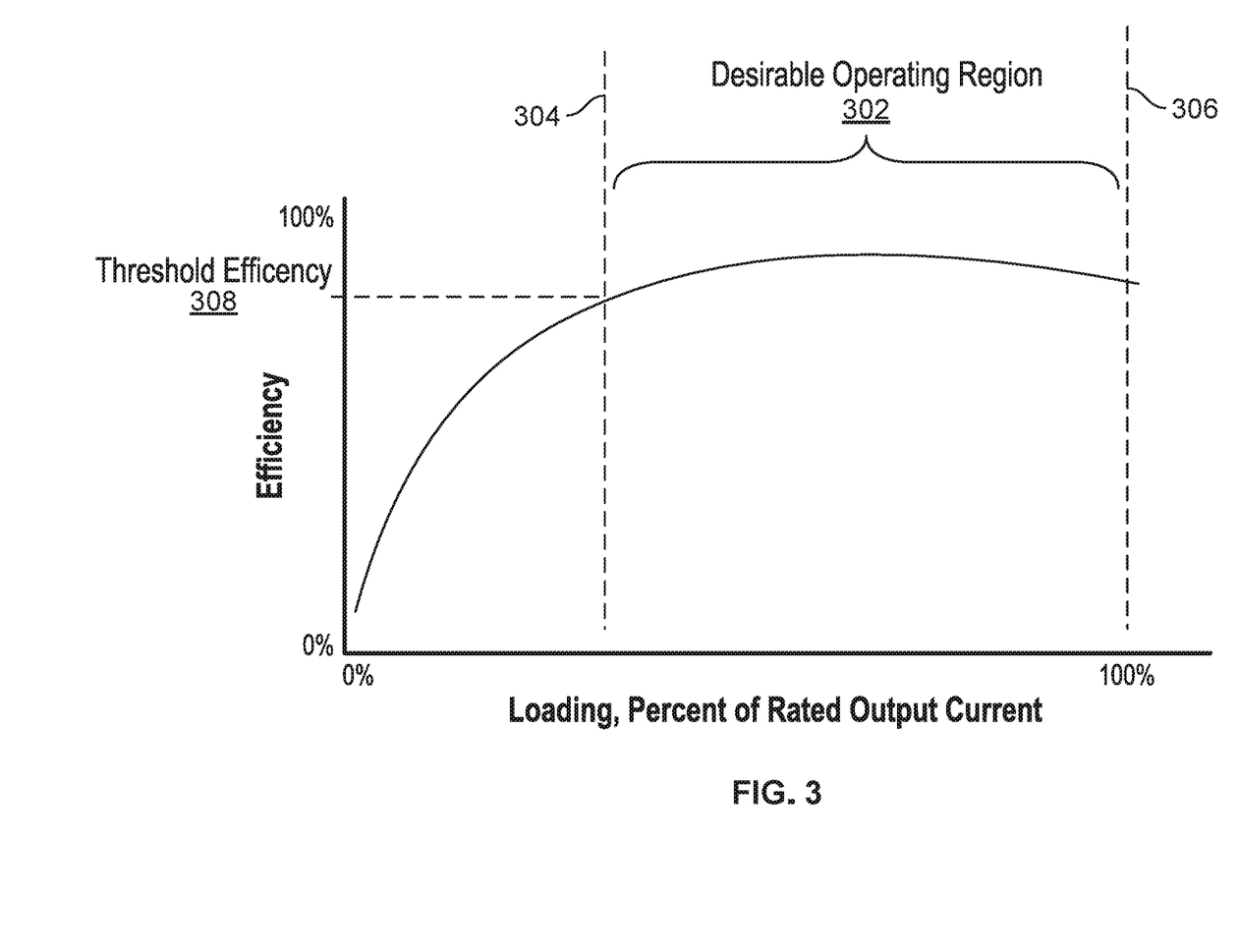
FIG. 3 is a plot illustrating an example desired operating region of a DC power converter.

In one embodiment, the current control circuit 212 regulates the output current from each of the power converters 130 to operate each power converter 130 within a desired operating region. FIG. 3 is a plot illustrating an example desired operating region 302. As shown in FIG. 3, efficiency of the power converter 130 is a function of the output current. The current control circuit 212 regulates the current output to operate between a lower current threshold 304 and an upper current threshold 306. In one embodiment, the lower current threshold 304 is the current output at which the efficiency of the converter 130 falls below a threshold efficiency 308. The upper current threshold 306 may be an upper rating for current output of the power converter 130 or a current output at which the efficiency of the converter 130 falls below a threshold efficiency. The upper and lower current thresholds may alternatively be defined in numerous other ways.

Figure 4:
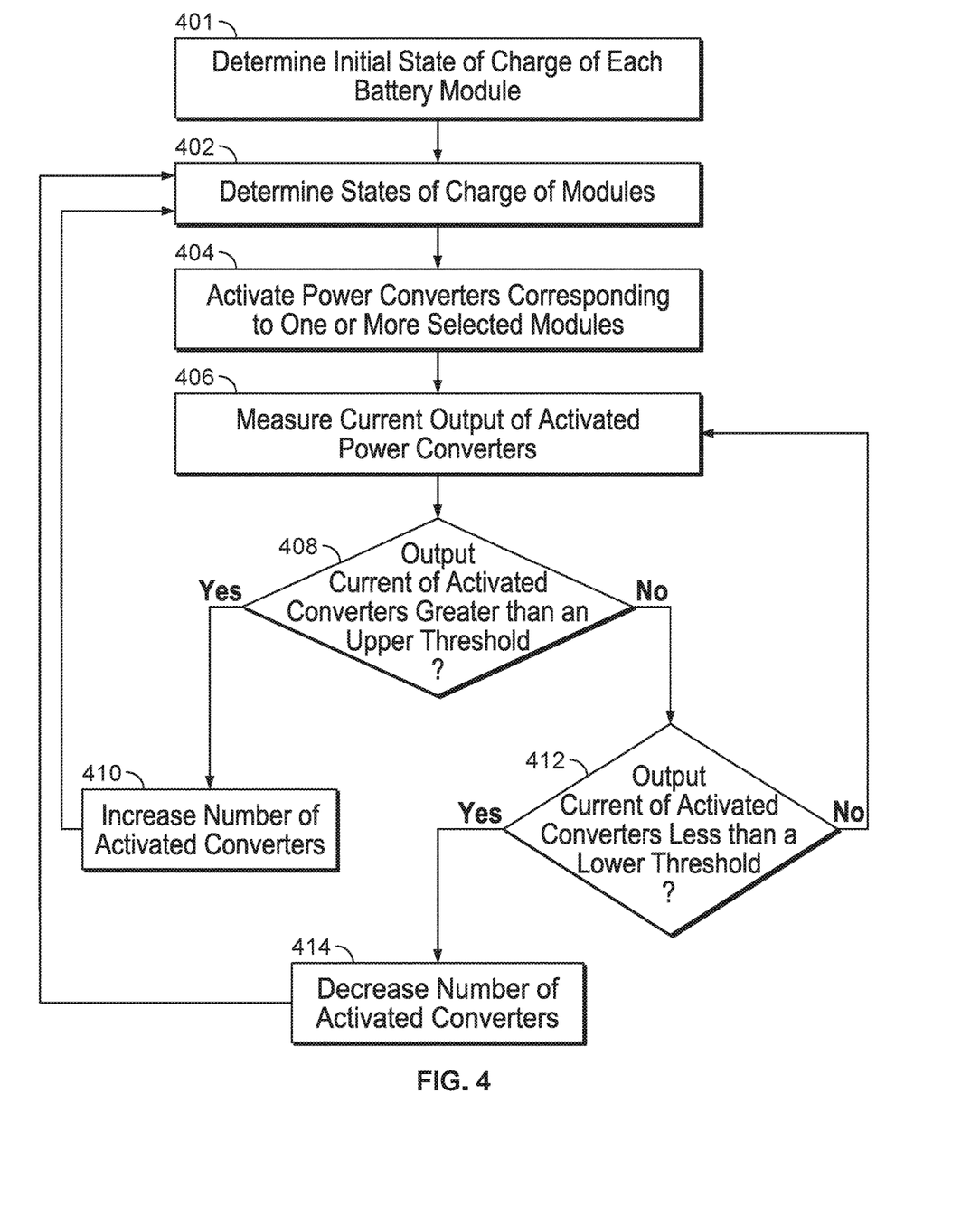
FIG. 4 is a flowchart illustrating a method for controlling DC power converters, according to one embodiment.

As described above, the controller 140 selectively enables the power converters 130 to output a low voltage $V_{Low}$ from one or more of the energy storage modules 110. One embodiment of a method used by the controller 140 to control the power converters 130 is shown in FIG. 4. In the embodiment illustrated in FIG. 4, the controller 140 selectively enables the power converters 130 based on an amount of charge withdrawn from the modules 110 as an estimate of the state of charge of each of the modules 110. In other embodiments, the controller 140 uses other properties of the modules 110 to selectively enable the converters 130. For example, one embodiment of the controller 140 receives a state of charge of each module 110 from the battery management system 120 corresponding to the module 110 and determines which power converters 130 to enable and which to disable to provide a desired low output voltage $V_{Low}$.

Referring to FIG. 4, the controller 140 determines 401, based on the battery charging and balancing process, an initial state of charge. The controller 140 then determines 402 the amount of energy withdrawn from each of the modules 110. In one embodiment, the controller 140 monitors the current output from each module 110 as the controller 140 drives the modules 110 to supply a low output voltage, and determines the state of charge of the module by subtracting the amount of energy withdrawn from the modules 110 from the state of charge estimated during the last time the modules 110 were charged.

Based on the amount of current withdrawn from each of the modules 110, the controller 140 enables 404 one or more power converters 130 corresponding to the modules 110 having lower amounts of charge withdrawn. For example, the controller 140 sorts an array corresponding to the modules 110 according to the amount of charge withdrawn from each of the modules, and selects one or more of the modules 110 in the array having the lowest charge output. Alternatively, if the controller 140 has a state of charge estimate of the modules 110, the controller 140 enables one or more power converters 130 corresponding to the modules 110 having the highest estimated states of charge.

The controller 140 measures 406 the current output of the enabled converters and compares the output current to upper and lower threshold values. If the current output is greater 408 than the upper threshold, the controller 140 increases 410 the number of enabled converters to decrease the current contributed by each enabled module 110. In contrast, if the current output is less than the upper threshold and less than the lower threshold 412, the controller 140 decreases 414 the number of enabled converters to increase the current contributed by each enabled module 110. If the current output is between the upper and lower thresholds, the controller 140 continues monitoring the current output and increases or decreases the number of enabled power converters 130 if the output current is not between the thresholds. Accordingly, the controller 140 maintains the output current from the enabled power converters 130 between upper and lower thresholds, such as the upper and lower thresholds 306 and 304 defining the desired operating range 302 shown in FIG. 3.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

Upon reading this disclosure, those of skill in the art will appreciate still additional alternative designs for the system. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in any claims drawn to the subject matter herein.

What is claimed is:

1. A system, comprising:
   a plurality of energy storage modules electrically connected together in series;
   a plurality of converters, wherein each converter in the plurality of converters is electrically connected to a corresponding energy storage module in the plurality of energy storage modules;
   a module balancer which is configured to:
      estimate a state of charge of each of the plurality of energy storage modules based on a current output of corresponding converter; and
   a converter controller which is configured to:
      control each individual converter among the plurality of converters;
      receive an estimated state of charge of each of the plurality of energy storage modules based on a current output of corresponding converter;
      select one or more converters from the plurality of converters to enable based on the estimated state of charge of one or more of the plurality of energy storage modules coupled to the one or more converters;
      enable the one or more selected converters, wherein:
         in response to being enabled, an enabled converter converts an input, from its corresponding energy storage module, at a first voltage level into an output at a second voltage level; and
         the outputs of the enabled converters are electrically combined to produce a combined output;
      compare the combined output of the enabled converters against a desirable operating region defined by an upper threshold and a lower threshold; and
      in response to the combined output of the enabled converters being outside of the desirable operating region, adjust a number of enabled converters.

2. The system recited in claim 1, wherein adjusting the number of enabled converters includes: in response to the combined output of the enabled converters exceeding the upper threshold, increasing the number of enabled converters.

3. The system recited in claim 1, wherein adjusting the number of enabled converters includes: in response to the combined output of the enabled converters not exceeding the lower threshold, decreasing the number of enabled converters.

4. The system recited in claim 1, wherein selecting one or more converters from the plurality of converters to enable includes: in response detecting a faulty energy storage module, excluding the converter which corresponds to the faulty energy storage module from being selected.

5. The system recited in claim 1, wherein selecting one or more converters from the plurality of converters to enable includes: in response detecting a faulty converter, excluding the faulty converter from being selected.

6. The system recited in claim 1, wherein:
   each of the plurality of converters includes a fuse; and
   in response detecting a faulty energy storage module, a fuse that is in the converter which corresponds to the faulty energy storage module is configured to electrically disconnect the converter which corresponds to the faulty energy storage module from the combined output of the enabled converters.

7. The system recited in claim 1, wherein:
   each of the plurality of converters includes a fuse; and
   in response detecting a faulty converter, a fuse that is in the faulty converter is configured to electrically disconnect the faulty converter from the combined output of the enabled converters.

8. The system of claim 1, wherein the module balancer is further configured to determine an amount of charge withdrawn from the plurality of energy storage modules corresponding to each of the plurality of converters based on a current output of the converter over time.

9. The system of claim 1, wherein the module balancer is further configured to monitor an amount of time each of the plurality of converters is enabled, and to rotate through the plurality of converters to enable the plurality of converters for approximately a same length of time.

10. A method, comprising:
    controlling each individual converter among a plurality of converters, wherein each converter among the plurality of converters is electrically connected to a corresponding energy storage module among a plurality of energy storage modules;
    estimating a state of charge of each of the plurality of energy storage modules based on a current output of corresponding converter;
    selecting one or more converters from the plurality of converters to enable based on the estimated state of charge of one or more of the plurality of energy storage modules coupled to the one or more converters;
    enabling the one or more selected converters, wherein:
       in response to being enabled, an enabled converter converts an input, from its corresponding energy storage module, at a first voltage level into an output at a second voltage level; and
       the outputs of the enabled converters are electrically combined to produce a combined output;
    comparing the combined output of the enabled converters against a desirable operating region defined by an upper threshold and a lower threshold; and
    in response to the combined output of the enabled converters being outside of the desirable operating region, adjusting a number of enabled converters.

11. The method recited in claim 10, wherein adjusting the number of enabled converters includes: in response to the combined output of the enabled converters exceeding the upper threshold, increasing the number of enabled converters.

12. The method recited in claim 10, wherein adjusting the number of enabled converters includes: in response to the combined output of the enabled converters not exceeding the lower threshold, decreasing the number of enabled converters.

13. The method recited in claim 10, wherein selecting one or more converters from the plurality of converters to enable includes: in response detecting a faulty energy storage module, excluding the converter which corresponds to the faulty energy storage module from being selected.

14. The method recited in claim 10, wherein selecting one or more converters from the plurality of converters to enable includes: in response detecting a faulty converter, excluding the faulty converter from being selected.

15. The method recited in claim 10, wherein:

each of the plurality of converters includes a fuse; and in response detecting a faulty energy storage module, a fuse that is in the converter which corresponds to the faulty energy storage module is configured to electrically disconnect the converter which corresponds to the faulty energy storage module from the combined output of the enabled converters.

16. The method recited in claim 10, wherein:

each of the plurality of converters includes a fuse; and in response detecting a faulty converter, a fuse that is in the faulty converter is configured to electrically disconnect the faulty converter from the combined output of the enabled converters.

17. The method of claim 10, further comprising:

determining an amount of charge withdrawn from the plurality of energy storage modules corresponding to each of the plurality of converters based on a current output of the converter over time.

18. The method of claim 10, further comprising:

monitoring an amount of time each of the plurality of converters is enabled; and rotating through the plurality of converters to enable the plurality of converters for approximately a same length of time.

19. A computer program product, the computer program product being embodied in a non-transitory computer readable storage medium and comprising computer instructions for:

controlling each individual converter among a plurality of converters, wherein each converter among the plurality of converters is electrically connected to a corresponding energy storage module among a plurality of energy storage modules;

estimating a state of charge of each of the plurality of energy storage modules based on a current output of corresponding converter;

selecting one or more converters from the plurality of converters to enable based on the estimated state of charge of one or more of the plurality of energy storage modules coupled to the one or more converters;

enabling the one or more selected converters, wherein:

in response to being enabled, an enabled converter converts an input, from its corresponding energy storage module, at a first voltage level into an output at a second voltage level; and the outputs of the enabled converters are electrically combined to produce a combined output;

comparing the combined output of the enabled converters against a desirable operating region defined by an upper threshold and a lower threshold; and in response to the combined output of the enabled converters being outside of the desirable operating region, adjusting a number of enabled converters.

20. The computer program product recited in claim 19, wherein adjusting the number of enabled converters includes: in response to the combined output of the enabled converters exceeding the upper threshold, increasing or decreasing the number of enabled converters.

* * * * *